United States Patent [19]

Barbieri et al.

[11] 4,188,125
[45] Feb. 12, 1980

[54] APPARATUS FOR THE DETERMINATION OF THE COLOR COMPOSITION OF THE PRINTING LIGHT IN A PHOTOGRAPHIC ENLARGER

[75] Inventors: Siegfried Barbieri; Wolfgang Kapfinger, both of Brixen, Italy

[73] Assignee: Durst AG Fabrik Fototechnischer Apparate, Bolzano-Bozen, Italy

[21] Appl. No.: 830,105

[22] Filed: Sep. 2, 1977

[30] Foreign Application Priority Data

Sep. 2, 1976 [IT] Italy .................. 4847 A/76

[51] Int. Cl.² .............................................. G01J 3/50
[52] U.S. Cl. ...................................... 356/404; 355/38
[58] Field of Search ................... 355/38; 356/175, 404

[56] References Cited
U.S. PATENT DOCUMENTS

| | | | |
|---|---|---|---|
| 3,114,283 | 12/1963 | Gruner | 355/1 |
| 3,245,309 | 4/1966 | Wick et al. | 355/38 X |
| 3,640,620 | 2/1972 | Shatz et al. | 355/38 |
| 3,649,118 | 3/1972 | Vano et al. | 355/38 |
| 3,685,901 | 8/1972 | Crete | 355/38 |

Primary Examiner—F. L. Evans
Attorney, Agent, or Firm—Connolly and Hutz

[57] ABSTRACT

An apparatus for determining the color composition of the printing light of a photographic enlarger samples and measures the light within the intermediate diaphragm chamber of the objective lens. The light is sampled by inserting color-sensitized photoelectric transducers within the intermediate diaphragm chamber or inserting a light conducting means within the chamber between exposures for sampling and conducting the light outside of the chamber to external photoelectric transducer means, which determines the color content in any operative manner. The light conductor may be mounted on a slide together with an adjustable diaphragm for alternating inserting in the path of the printing light or the light conductor and a number of apertures of different cross-sections may be mounted on a rotary disk for optional insertion along the optical axis. The light conducting means includes a diffusing element within a light conducting and reflecting chamber. A removable diffusing element is also mounted in line with the adjustable diaphragm on the slide.

12 Claims, 8 Drawing Figures

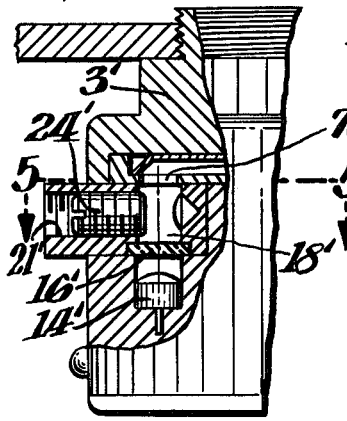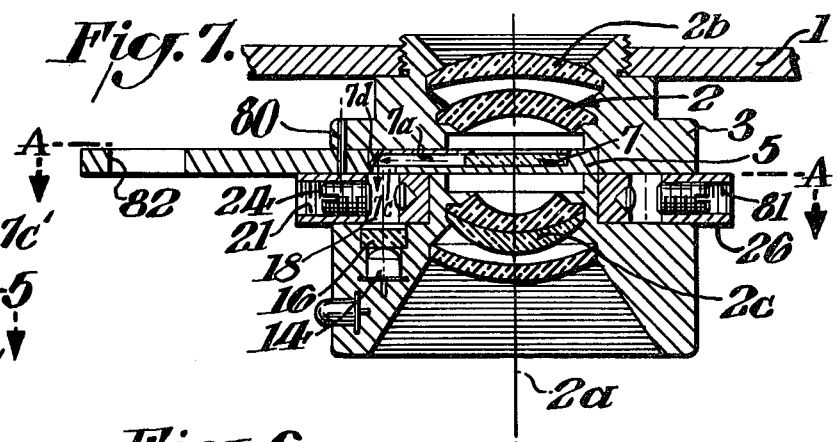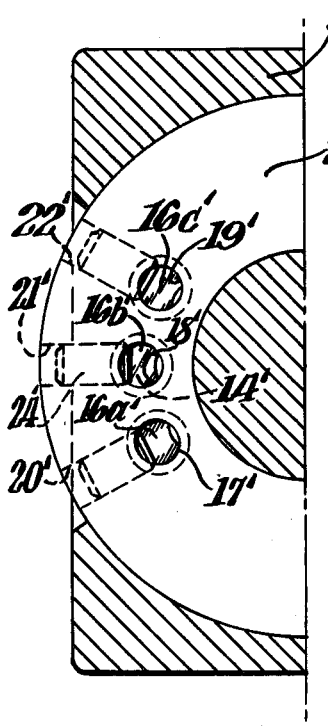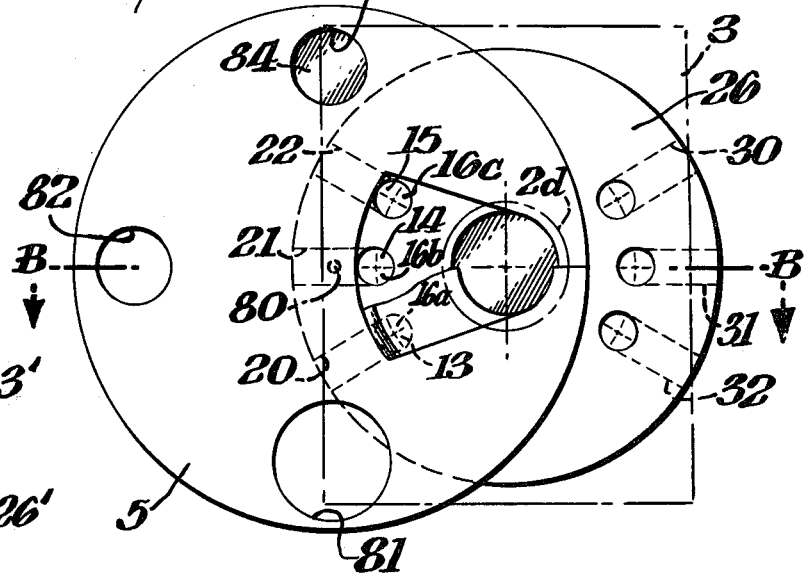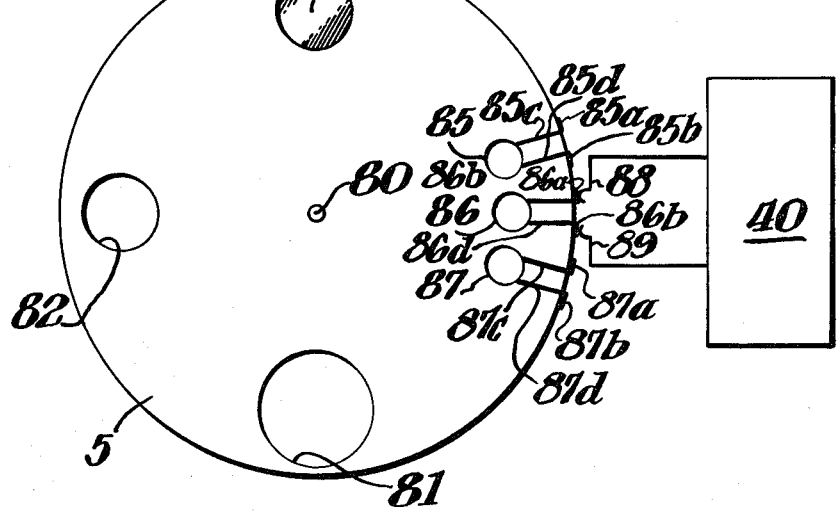

APPARATUS FOR THE DETERMINATION OF THE COLOR COMPOSITION OF THE PRINTING LIGHT IN A PHOTOGRAPHIC ENLARGER

BACKGROUND OF THE INVENTION

The invention relates to a measuring apparatus with at least one photoelectric transducer for the determination of the color composition of the copying light in photographic enlarging apparatus.

Known measuring apparatus of such type have at least one measuring probe, containing a photoelectric transducer, which is inserted into the copying light beam path directly below the lens of an enlarging apparatus during the measuring procedure. Such a measuring position of the probe is selected, inter alia, because a measuring light of greater intensity is available in this position, whereby relatively strong measuring signals may be obtained and relatively inexpensive photoelectric transducers and/or circuits may be employed for the evaluation of such signals.

At the outlet of the lens, the light beam contains differently distributed, color-distinguished zones, according to the color distribution over the cross-sectional area. The colors are, therefore, not mixed in such a manner that an overall measurement, entirely free of error is possible. If only one transducer is utilized, care must be taken that the measuring probe is disposed in the same position relative to the lens for each measurement, because even negligible displacements can affect the measuring result accuracy. This is because, as previously mentioned, the light impinging on the transducer is not homogeneous in color content and consequently with displacement from positions previously taken, a different color component is measured. If several transducers are inserted into the light beam simultaneously in order to have simultaneously available a measuring signal for two or all three primary colors, for example, consistent measuring results may be achieved only then when the measuring light is mixed before it impinges on the transducers, something which requires, therefor, a light-mixing compartment of a certain length or other known means for light mixing. When utilizing such means, the light available for the measuring is diminished. Furthermore, measuring probes with light-mixing means are larger and heavier, for which reason their insertion and eventual mounting below the lens is cumbersome. Still further when light-mixing means is used, it is impossible to construct the measuring arrangement as small as otherwise afforded by the known circuits for light measuring apparatus.

For measuring, the probe may be mounted either below the lens, e.g., at the housing thereof, or it may be pivoted into this position. In the first solution, the operation is cumbersome, because the measuring probe must be individually positioned for each measurement and must repeatedly be removed and set aside during each copying operation. In the second-mentioned procedure, the measuring probe pivots about an axis on the enlarging apparatus, e.g., on the lens holder. In order that a pivoting of the measuring probe below the lens may be possible for various types of apparatus and lenses, the rotary mounting must be constructed relatively expensively or there must be produced an individual mounting device for each apparatus-lens combination, which in both instances unduly increase the cost of the measuring apparatus.

The object of this invention is to provide a measuring apparatus of the initially described type, wherein precise positioning of the photoelectric transducer has less of an influence on the color measuring accuracy than with the known apparatus wherein even in the use of several photoelectric transducers, light-mixing means are not necessary and wherein the other mentioned disadvantages are eliminated.

SUMMARY

A color determining apparatus for a photographic enlarger is constructed and arranged to sample the light within the intermediate diaphragm chamber within the objective lens. Photoelectric transducer means may accordingly be positioned within the intermediate diaphragm chamber or a light conducting means may be inserted within the chamber between exposures to sample the light within the chamber and conduct it to color sensitized photoelectric transducers disposed external to the intermediate diaphragm chamber. Variable light channels may be diposed between the light conducting means and the transducers by, for example, mounting them within a rotary disk. The light conducting means and an adjustable diaphragm for varying the area of the printing light may be mounted on a slide for alternate disposition along the optical axis. The light conducting means may utilize a diffusing element and reflecting compartment and a diffusing element may also be mounted for insertion and removal in line with the adjustable diaphragm. The light conducting element and a number of apertures of different cross sections may also be mounted on a rotary disk for alternate insertion along the optical axis.

By an embodiment according to the invention, a measuring apparatus is obtained which, with lesser structural expenditure than in known apparatus, makes possible certain improved measuring results. This is because slight deviations in the measuring position of the measuring probe do not cause significant deviations in the measuring result because of the substantial light-mixing which occurs in the intermediate diaphragm chamber of the objective lens. The serviceability of such arrangement being furthered because the mounting or pivoting of a measuring probe below the lens is eliminated.

Furthermore, such arrangement affords a considerable degree of miniaturization of such a measuring apparatus and its attractive incorporation in an enlarging apparatus. When several measuring transducers, situated in the measuring light beam during the measuring, the previously-required light-mixing means are eliminated, since in the intermediate diaphragm chamber of the objective lens, as mentioned above, the light is homogeneous in color content without any zones of different brightness.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 4 is a fragmental view in elevation partially broken away to show an alternate embodiment of the device shown in FIGS. 1-3;

FIG. 5 is a cross-sectional view taken along line 5—5 of FIG. 4; and

FIG. 6 is a partially schematic cross-sectional view taken along the line A—A of FIG. 7 to show an alternate embodiment of the device shown in FIGS. 1-3;

FIG. 7 is a cross sectional view taken along the line B—B of FIG. 6; and

FIG. 8 is a partially schematic cross-sectional view of a part of an alternate embodiment of the device shown in FIGS. 6 and 7.

DESCRIPTION OF THE PREFERRED EMBODIMENTS

Figure 1:
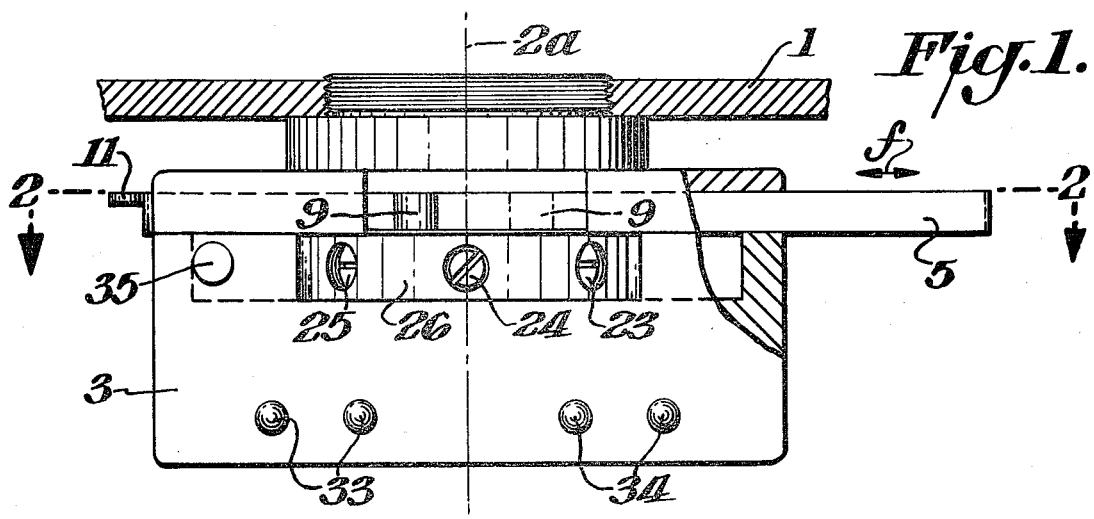
FIG. 1 is a side view in elevation of the measuring probe for a photographic enlarger.

A housing 3, incorporating a five-lens objective 2, for example, mounted on an enlarging apparatus 1, of which only a portion is shown, contains a slot-shaped aperture 4 (shown in FIG. 2) in a plane normal to the lens axis 2a, wherein a slide 5 is movably arranged in the direction of arrow f. Slide 5 can assume two end positions within aperture 4. One being illustrated in FIG. 1 and the second being shown in FIG. 2. As shown in FIG. 3, aperture 4 is arranged in housing 3 in such a manner that slide 5 is placed in the intermediate diaphragm chamber 2d of lens 2 between two lens groups 2b and 2c, chamber 2d holding in normal lenses a diaphragm having an adjustable aperture.

Slide 5 contains two units insertable into the intermediate diaphragm space 2d, one consisting of an iris diaphragm 6, having a variable cross-sectional area, and the second containing light-conducting means 7 to be described in greater detail below. Depending on the end position taken by slide 5, either iris diaphragm 6 or light-conducting means 7 is placed in the intermediate diaphragm spaced 2d and thus on the optical axis 2a of lens 2. When iris diaphragm 6 is positioned in optical axis 2a, it can influence the light beam conducted through the lens by changing the position of the individual diaphragm segments 8 by means of adjusting lever 9. Such position of slide 5 (shown in FIG. 1) is maintained for the copying procedure, wherein the exposure of the photosensitive material (not shown) takes place. In order to be able to determine prior to such an exposure the necessary light intensity and exposure time, respectively, on the projection plane (not shown) of the enlarging apparatus 1, often diffuse light is needed on the projection plane. For this purpose, above iris diaphragm 6, a diffusing screen 12 may be pivoted into the beam path of lens 2 by means of lever 11, which is rotatably mounted upon axis 10. The desired diffusing effect of the projected light being achieved by means of such diffusing screen 12. With use of pivoted diffusing screen 12, a light measurement in the plane of projection is related, therefore, to the average density of the projected picture original.

Figure 2:
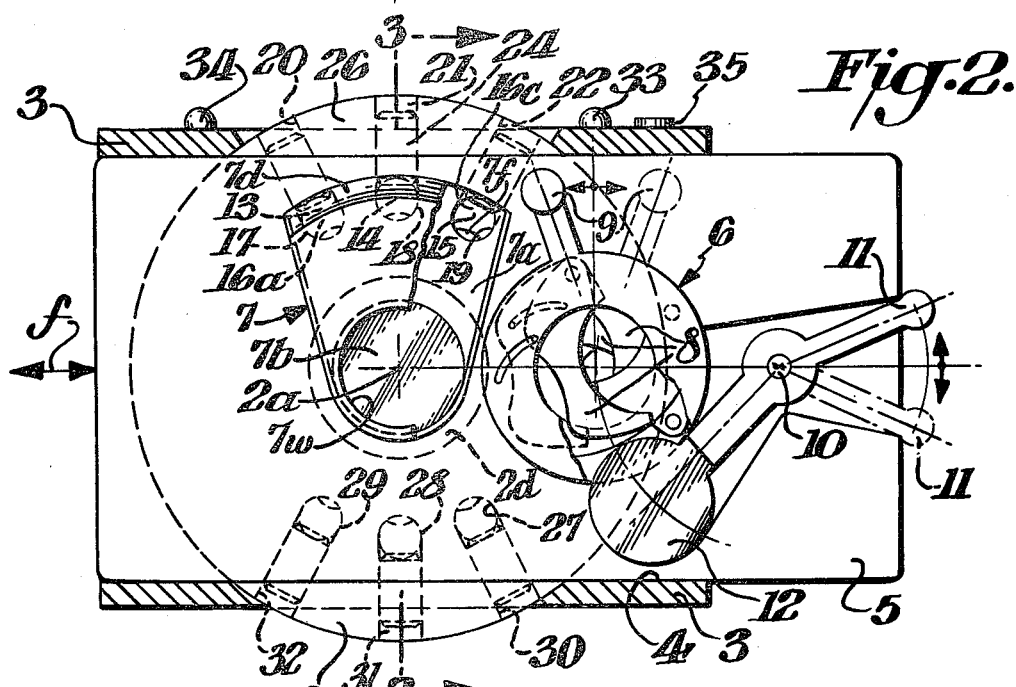
FIG. 2 is a cross-sectional view taken along line 2—2 of FIG. 1.
Figure 3:
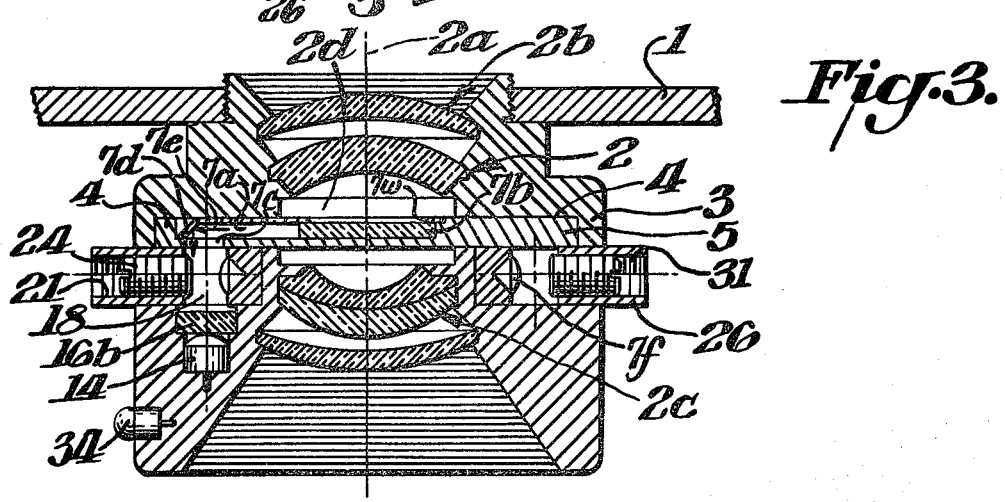
FIG. 3 is a cross-sectional view taken along the line 3—3 of FIG. 2.

For the measurement of the color composition of the copying light, slide 5 is brought into the end position, wherein the light-conductive means 7 is situated in the beam path 2a of lens 2 (as shown in FIG. 2) the light-conducting means 7 includes, for example, an inner reflecting light-conducting compartment 7a and a diffusing screen 7b, disposed therein in line with window 7a arranged in the intermediate diaphragm space 2d in the end position of slide 5 illustrated in FIG. 2. Diffusing screen 7b picks up the copying light to be measured and directs it into the light-conducting compartment 7a, which has a light-emergence aperture 7c and a deflecting surface 7d, which is positioned in such a manner that the light in the light-conducting compartment is reflected and transmitted in a manner characterized by the directional arrows 7e in FIG. 3, to leave the light-conducting compartment 7a through aperture 7c and impinge on, for example, three photoelectric transducers 13, 14, 15 situated in housing 3, each of which being sensitized for a different color of the three primary colors red, green and blue. This sensitizing is achieved, for example, in that each individual photoelectric transducer is in series with a color filter of a different primary color, e.g., a red filter 16a before transducer 13, a green filter 16b before transducer 14 and a blue filter 16c before transducer 15.

As previously mentioned, the light in the intermediate diaphragm space 2d is mixed in such a manner that in the shunting off the measuring light from this space, no further mixing members are required in order to be able to conduct color-homogeneous light simultaneously to several photoelectric transducers. Diffusing element 7b, which exerts an additional mixing effect, is primarily used for its light-conducting properties.

In order to be able to influence quantitatively the light flux falling on photoelectric transducers 13, 14, 15, there are provided, between the light-emergence aperture 7c and these three transducers, three seperate light channels 17, 18, 19, whose cross-sections are continuously variable by three light-adjusting screws 23, 24, 25 insertable into corresponding threaded bores 20, 21, 22. By the respective insertion of the screws into the individual light channels, the measuring apparatus may be calibrated in a known manner. It is also possible to adjust the measuring apparatus for more than one calibrating situation. For this purpose, light channels 17, 18, 19, which are furnished with light-adjusting screws 23, 24, 25, are mounted in a ring 26 rotating in guideways of housing 3. Ring 26 contains one or several further groups of light channels with variable cross-sectional area, e.g. light channels 27, 28, 29 with corresponding threaded bores 30, 31, 32 into which light-adjusting screws are insertable.

By turning ring 26 about its rotational axis, coinciding with objective axis 2a, the individual groups of light channels may be positioned in line with respective photoelectric transducers, whereby the measuring apparatus is prepared at a given time for different calibrating situation, e.g., for exposure of a copying material with characteristics different from the first.

Photoelectric transducers 13, 14, 15 are connected with a non-illustrated measuring circuit for the evaluation of the light signals picked up which circuit is also accommodated in house 3, for example. The measuring circuit may be, for example, a bridge circuit whose balance condition is indicated by two groups 33, 34 of indicator lamps each, which in a given instance signify a light balance. For example, light balance lamps 33 indicate the proportion of primary colors red and blue, and light balance lamps 34 indicate the proportion of the primary colors red and green. A (non-illustrated) power source, also accommodated in house 3, is connected by a switch 35 with the measuring circuit. A measuring circuit usable with this invention, for example, is described in U.S. Pat. No. 3,985,450.

This invention is not limited to only one manner of application, wherein three photoelectric transducers are simultaneously exposed to the copying light to be measured by means of the inserted light-conducting means.

For example, only a single transducer 14' may be used as shown in FIGS. 4 and 5, which is sensitive to all three primary colors. In such an instance, light channels 17', 18', 19' and 27', 28', 29', respectively, provided in ring 26, each contains in addition to the light-adjusting screws also a color filter. For example, light channel 17' contains a red filter 16a'. Light channel 18' contains a green filter 16b' and light channel 19' contains a blue filter 16c'. Only the light of the color corresponding to the particular filter can, therefore, pass through the individual light channels. By turning ring 26', the color filters corresponding to the individual primary colors may be correlated in sequence with the photoelectric transducer, and thus a measurement of the color composition of the copying light may be achieved in a known manner. The measuring circuit required for this purpose may be a bridge circuit, for example, wherein the photoelectric transducer forms a branch. Such a measuring circuit is described, for example, in U.S. Pat. No. 4,030,833. However, other measuring circuits are also feasible and their construction depends mainly on the type of photoelectric transducer employed.

In a further specific embodiment, in place of slide 5, (as shown in FIGS. 6 and 7) rotary diaphragm rotatable about an axis 80, known per se, having a certain number of apertures of various cross-sections is operatively positioned in the intermediate diaphragm space of the objective. One of these apertures contains light-conducting means, which in an analogous manner may be constructed like the one on slide 5, for conducting the light from the intermediate diaphragm space to the photoelectric transducers situated in housing 3, provided the light conductor is inserted into the intermediate diaphragm space by the corelative angular disposition of the rotary diaphragm. In the other angular positions of the rotary diaphragm, the diaphragm apertures, inserted one at a time, adjust the cross-sectional area of beam passing through the objective lens. E.g., aperture 81 is inserted during the focussing procedure and aperture 82 is inserted during the copying procedure of the enlarger. Aperture 83 contains a diffusing screen 84, if diffused light on the projection plane is needed.

It is not absolutely necessary to conduct light out from the intermediate diaphragm space through light-conducting means to the photoelectric transducers situated outside such intermediate space. Exemplary embodiment are feasible wherein for individual primary colors, sensitized transducers may be inserted (as shown in FIG. 8), directly into the intermediate diaphragm space between the individual lens components of the objective lens for measuring purposes. The transducers 85, 86, 87, each sensitized for a different one of the colors red, green and blue, may be arranged on a rotary diaphragm similar to diaphragm shown in FIG. 6 and positioned in the same space replacing diaphragm of FIG. 6. Similar numerals in FIG. 8 are referred to similar parts in FIG. 6. Rotating the rotary diaphragm angularly about axis 80 each transducer can be placed into the intermediate diaphragm space. On the circumference of the rotary diaphragm two electrical contacts 85a, b, 86a, b, 87a, b for each transducer are connected to it by connections 85c, d; 86c, d; 87c, d;. Two sliding contacts 88; 89 fixed to housing 3 are connectable to the several pairs of contacts of the transducers by appropriate angular displacement of the rotary diaphragm. Contacts 88, 89 are connected to a measuring circuit 40.

We claim:

1. An apparatus for determining the color composition of printing light in a photographic enlarger having an objective lens with an intermediate diaphragm chamber by utilizing color-sensitive photoelectric transducer means comprising a construction and arrangement wherein removable sampling means is disposable in the intermediate diaphragm chamber for causing a sample of the light in the intermediate diaphragm chamber to impinge on the photoelectric transducer means, a light measuring circuit is connected to the transducer means whereby the color composition of the light in the intermediate diaphragm chamber is interpreted from the sample and the removable means being operative for removing the removable sampling means from the intermediate diaphragm chamber for performing an exposure through the objective lens.

2. An apparatus as set forth in claim 1, wherein the photoelectric transducer means is disposed substantially within the intermediate diaphragm chamber.

3. An apparatus as set forth in claim 1, wherein the photoelectric transducer means is disposed outside of the intermediate diaphragm chamber, a light conducting means is disposed within the intermediate diaphragm chamber and extends therefrom to impinge light sampled from the intermediate diaphragm chamber upon the photoelectric transducer means.

4. An apparatus as set forth in claim 3, wherein the light conducting means includes a light conducting compartment and a light diffusing element mounted in the light conducting compartment.

5. An apparatus as set forth in claim 4, wherein light reflecting means is mounted within the light conducting compartment to help direct light therefrom to the photoelectric transducer means.

6. An apparatus as set forth in claim 3, wherein a number of light channelling means having variable cross sectional areas are disposed between the light conducting means and the photoelectric transducer means for calibrating the apparatus for determining different color compositions.

7. An apparatus as set forth in claim 6, wherein the light channelling means are mounted in a rotary disc having an axis of rotation, the objective lens having a longitudinal axis and the axis of rotation of the rotary disc substantially corresponding to the longitudinal axis of the objective lens.

8. An apparatus as set forth in claim 1, wherein the objective lens is mounted on a housing, a light measuring circuit having components is connected to the photoelectric transducer means, and the components of the light measuring circuit are also mounted in the housing.

9. An apparatus for determining the color composition of printing light in a photographic enlarger having an objective lens with an intermediate diaphragm chamber by utilizing color-sensitive photoelectric transducer means comprising a construction and arrangement wherein the light in the intermediate diaphragm chamber is caused to impinge on the photoelectric transducer means whereby the color composition of the light in the intermediate diaphragm chamber is interpreted, the photoelectric transducer means is disposed outside of the intermediate diaphragm chamber, a light conducting means is disposed within the intermediate diaphragm chamber and extends therefrom to impinge light sampled from the intermediate diaphragm chamber upon the photoelectric transducer means, slide means is mounted on the objective lens for disposing different portions thereof optionally wherein the light-conducting means is mounted on a portion of the slide means for optional insertion inside of the intermediate diaphragm chamber for sampling the light to determine its color composition and outside of the intermediate diaphragm chamber to permit an exposure to be performed.

10. An apparatus as set forth in claim 9, wherein an adjustable diaphragm is mounted on another portion of the slide means whereby the cross-sectional area of a printing light beam may be adjusted while the light conducting means is disposed outside of the intermediate diaphragm chamber.

11. An apparatus as set forth in claim 10, wherein diffusing lens means is removably mounted on the slide for disposition in line with and outside of the adjustable diaphragm.

12. An apparatus for determining the color composition of printing light in a photographic enlarger having an objective lens with an intermediate diaphragm chamber by utilizing color-sensitized photoelectric transducer means comprising a construction and arrangement wherein the light in the intermediate diaphragm chamber is caused to impinge on the photoelectric transducer means, a light measuring circuit is connected to the transducer means whereby the color composition of the light in the intermediate diaphragm chamber is interpreted, the photoelectric transducer means is disposed outside of the intermediate diaphragm chamber, a light conducting means is disposed within the intermediate diaphragm chamber and extends therefrom to impinge light sampled from the intermediate diaphragm chamber upon the photoelectric transducer means, the light conducting means includes a light conducting compartment and a light diffusing element mounted in the light conducting compartment, a rotary disc is mounted on the objective lens for disposition of different portions thereof within the intermediate diaphragm chamber, and the different portions using color-sensitized transducer means which are sensitized for different colors.

* * * * *